(12) United States Patent
Tang

(10) Patent No.: US 6,178,747 B1
(45) Date of Patent: Jan. 30, 2001

(54) VENTED RESERVOIR FOR A MASTER CYLINDER

(75) Inventor: Louis S. Tang, Novi, MI (US)

(73) Assignee: Kelsey-Hayes Company, Livonia, MI (US)

(*) Notice: Under 35 U.S.C. 154(b), the term of this patent shall be extended for 0 days.

(21) Appl. No.: 09/334,007

(22) Filed: Jun. 15, 1999

(51) Int. Cl.[7] .................................................. B60T 11/26
(52) U.S. Cl. ............................................. 60/585; 215/261
(58) Field of Search ........................... 60/585, 453, 478; 92/79; 220/371, 373; 215/261, 308

(56) References Cited

U.S. PATENT DOCUMENTS

| | | |
|---|---|---|
| 3,622,033 * | 11/1971 | Butler et al. ......................... 220/371 |
| 4,271,977 * | 6/1981 | Saigne ................................. 220/371 |
| 4,337,875 | 7/1982 | Lyons . |
| 5,022,713 | 6/1991 | Pugh et al. . |

FOREIGN PATENT DOCUMENTS

778972 * 7/1957 (GB) ...................................... 60/585

* cited by examiner

Primary Examiner—F. Daniel Lopez
(74) Attorney, Agent, or Firm—MacMillan, Sobanski & Todd, LLC

(57) ABSTRACT

A reservoir including a housing having a chamber formed therein for the storage of hydraulic brake fluid. The chamber is in fluid communication with a master cylinder. The housing has an opening which is in communication with the atmosphere. The housing further including a passageway in communication with the cavity and the opening. A membrane is disposed in the passageway of the housing. The membrane has oleophobic properties such that the membrane permits the passage of air therethrough and substantially prevents the passage of brake fluid therethrough.

20 Claims, 3 Drawing Sheets

VENTED RESERVOIR FOR A MASTER CYLINDER

BACKGROUND OF THE INVENTION

This invention relates in general to vehicle brake systems, and in particular to vented reservoirs for master cylinders.

Vehicle braking systems generally include a driver operated brake pedal which is connected to a master cylinder. The master cylinder is in fluid communication with brakes at associated wheels of the vehicle. Operation of the brake pedal actuates the master cylinder to supply pressurized brake fluid to the brakes, thereby decelerating the vehicle or preventing the vehicle from moving from a stopped position. A booster may also be provided between the brake pedal and the master cylinder to assist the pedal effort by the driver of the vehicle.

Master cylinders generally include a body having a cylindrical bore formed therein. In a typical tandem (two piston) master cylinder, a primary piston and a secondary piston are slidably disposed within the cylindrical bore. The pistons are operatively connected to the brake pedal by an input rod extending through one end of the master cylinder. The body of the tandem master cylinder and the pair of pistons define primary and secondary fluid chambers. The primary and secondary chambers are in fluid communication with separate primary and secondary brake hydraulic circuits, respectively. The primary and secondary brake hydraulic circuits are connected to certain ones of the brakes on the vehicle.

To operate the brake system, the driver depresses the brake pedal which inputs a force to the input rod. The force from the input rod acts against the primary piston. The force is selectively applied to urge the primary piston to pressurize the brake fluid in the primary chamber. The primary chamber is in fluid communication with the primary brake hydraulic circuit. The secondary piston forms one wall of the primary pressure chamber, and is thus acted upon by the pressure in the primary pressure chamber. The secondary piston is thus urged by the pressure in the primary pressure chamber to pressurize the brake fluid in a secondary pressure chamber. The secondary chamber is in fluid communication with the secondary brake hydraulic circuit.

Master cylinders are generally provided with a reservoir for storage of brake fluid. The brake fluid within the reservoir is selectively in fluid communication with the primary and secondary chambers of the mastery cylinders. When the master cylinder is not actuated, the reservoir is in fluid communication with the primary and secondary chambers. When the master cylinder is actuated, such as by depression of the brake pedal, the communication between the reservoir and the primary and secondary chambers is closed to allow the chambers to pressurize. The reservoir functions to store a volume of brake fluid to compensate for the volumetric changes in the primary and second chambers and the hydraulic brakes lines of the hydraulic circuits. The volumetric changes can be caused by the wear of the brake linings of the wheel brakes, thermal expansion and contraction of various components of the brake systems, and leakage.

The reservoirs can be vented or non-vented. In vented reservoirs, the fluid stored in the reservoir is vented to atmospheric pressure so that as the fluid level of the brake fluid within the reservoir changes, a pressure differential between the interior of the reservoir and the atmosphere does not occur. A pressure differential between the interior of the reservoir and the atmosphere may interfere with the proper function of a brake system requiring a vented reservoir.

Commonly, venting is provided by the use of one or more relatively small openings formed through a reservoir cap. The cap generally closes off the opening of a relatively large filling port of the reservoir. Due to movement of the vehicle and external forces acting on the fluid within the reservoir, fluid can escape through the relatively small opening in the cap. It has been known to provide a series of internal buffing plates formed in the cap, to provide a baffled or labyrinth-like passageway through the cap to help prevent the escape of fluid. The cap can also include a sealing gasket disposed in the vent passageway, wherein the sealing gasket has one or more slits formed therein which open when a relatively low pressure differential occurs between the reservoir and the atmosphere. However, because of space limitations and packaging restraints of the location of the master cylinder and reservoir within an engine compartment of the vehicle, the slotted sealing gaskets and labyrinth passageways may not suitably prevent the escape of fluid during all vehicle orientation and operating conditions. It is also desirable to prevent water and other external contaminants from entering the reservoir through the cap openings. The slotted sealing gaskets and labyrinth passageways may not suitably prevent the entrance of these contaminants.

BRIEF SUMMARY OF THE INVENTION

This invention relates in general to an improved vented reservoir for a master cylinder for use in a vehicle brake system.

The reservoir includes a housing having a chamber formed therein. The chamber is used for the storage of hydraulic brake fluid. The housing has an opening which is in communication with the atmosphere. The housing further including a passageway in communication with the cavity and the opening. A membrane, in accordance with the present invention, is disposed in the passageway of the housing. The membrane has oleophobic properties such that the membrane permits the passage of air therethrough and substantially prevents the passage of brake fluid therethrough.

Various objects and advantages of this invention will become apparent to those skilled in the art from the following detailed description of the preferred embodiment, when read in light of the accompanying drawings.

DETAILED DESCRIPTION OF THE INVENTION

Figure 1:
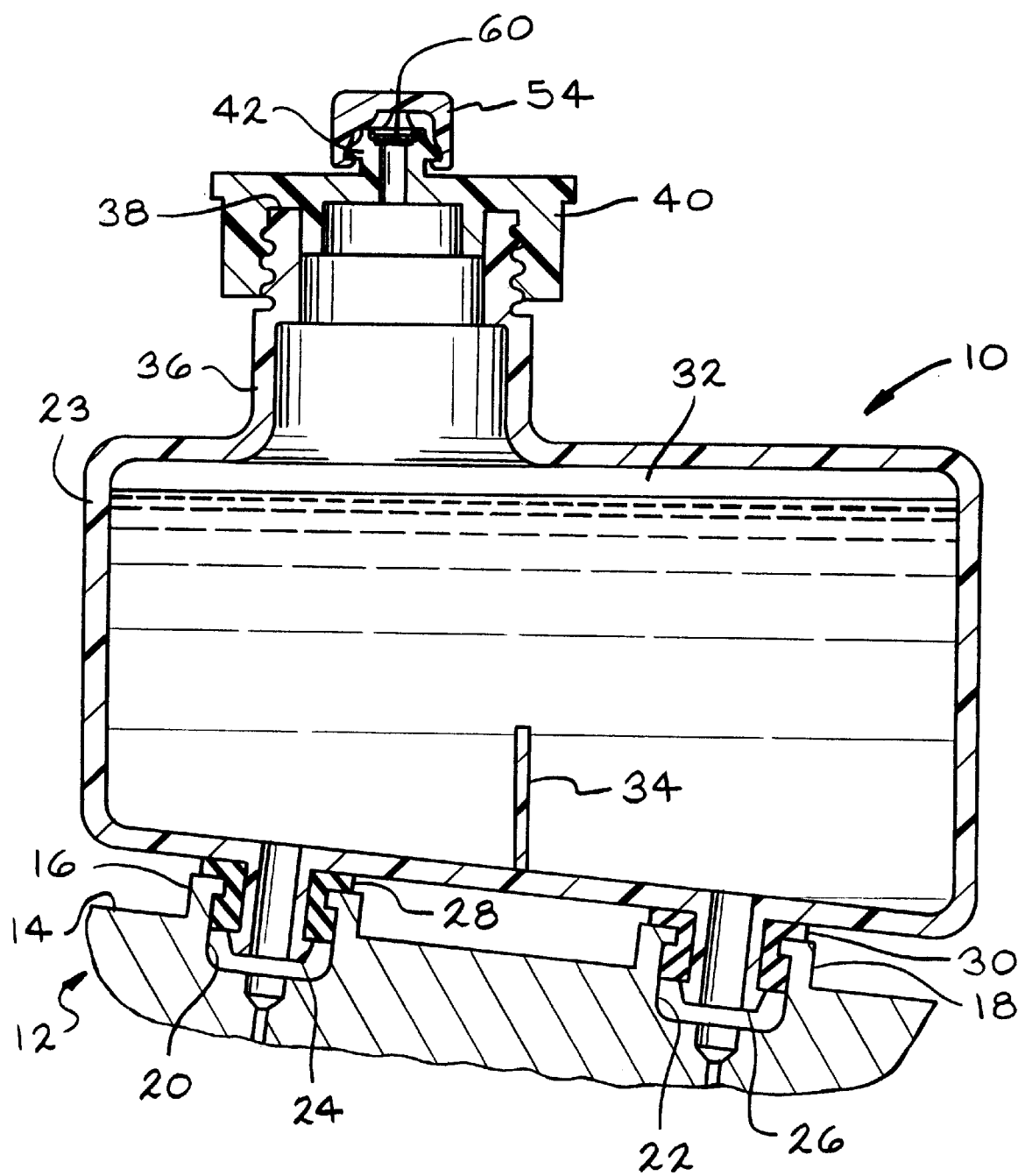
FIG. 1 is a sectional view of a master cylinder and vented reservoir, in accordance with the present invention.

Referring now to the drawings, there is illustrated in FIG. 1 a reservoir, indicated generally at 10. The reservoir 10 is connected to a conventional master cylinder (partially shown), indicated generally at 12. The master cylinder 12 includes a housing 14 having a pair of raised bosses 16 and 18 extending upwardly therefrom. Each boss 16 and 18 has a passageway or port 20 and 22, respectively, formed therethrough. The ports 20 and 22 are selectively in fluid communication with primary and second chambers (not shown) of the master cylinder 12.

The reservoir 10 has a housing 23 which can be formed of any suitable material, such as for example, a blow-molded plastic material. The reservoir 10 is mounted on the housing 14 of the master cylinder 12 by a pair of tubular extensions 24 and 26. The tubular extensions 24 and 26 are received in the ports 20 and 22 of the bosses 16 and 18, respectively, in cooperation with a pair of annular seals 28 and 30. Of course, the reservoir 10 can be mounted on the master cylinder 12 by any suitable manner and may even be integral with the housing 14 of the master cylinder 12.

The reservoir 10 has a generally hollow interior defining a fluid chamber 32 for the storage of hydraulic brake fluid. As will be discussed in detail below, the fluid chamber 32 of the reservoir 10 is vented to atmosphere. The brake fluid within the chamber 32 is in fluid communication with the interior of the tubular extensions 24 and 26, and the ports 20 and 22 of the housing 14 of the master cylinder 12. Thus, the brake fluid within the chamber 32 is in selective fluid communication with the primary and secondary chambers (not shown) of the master cylinder 12.

If desired, the reservoir can have a separator wall 34 formed in the interior thereof to separate the lower portions of the chamber 32 into two separate fluid chambers. It is sometimes advantages to separate the lower portions of the chamber 32 into two separate chambers so that if a fluid leak occurs in one of the hydraulic circuits corresponding to one of the primary or secondary chambers of the master cylinder, the reservoir 10 will not completely drain of fluid but instead will hold a storage of fluid for the primary or secondary chamber corresponding to the non-leaking hydraulic circuit.

The reservoir 10 includes a generally cylindrical hollow spout 36 extending upward from the housing 23 of the reservoir 10, as shown in FIG. 1. The interior of the spout 36 is in fluid communication with the chamber 32. The spout 36 has a relatively large opening 38 to provide easy access to the interior of the reservoir 10 to fill the chamber 32 with brake fluid.

Figure 2:
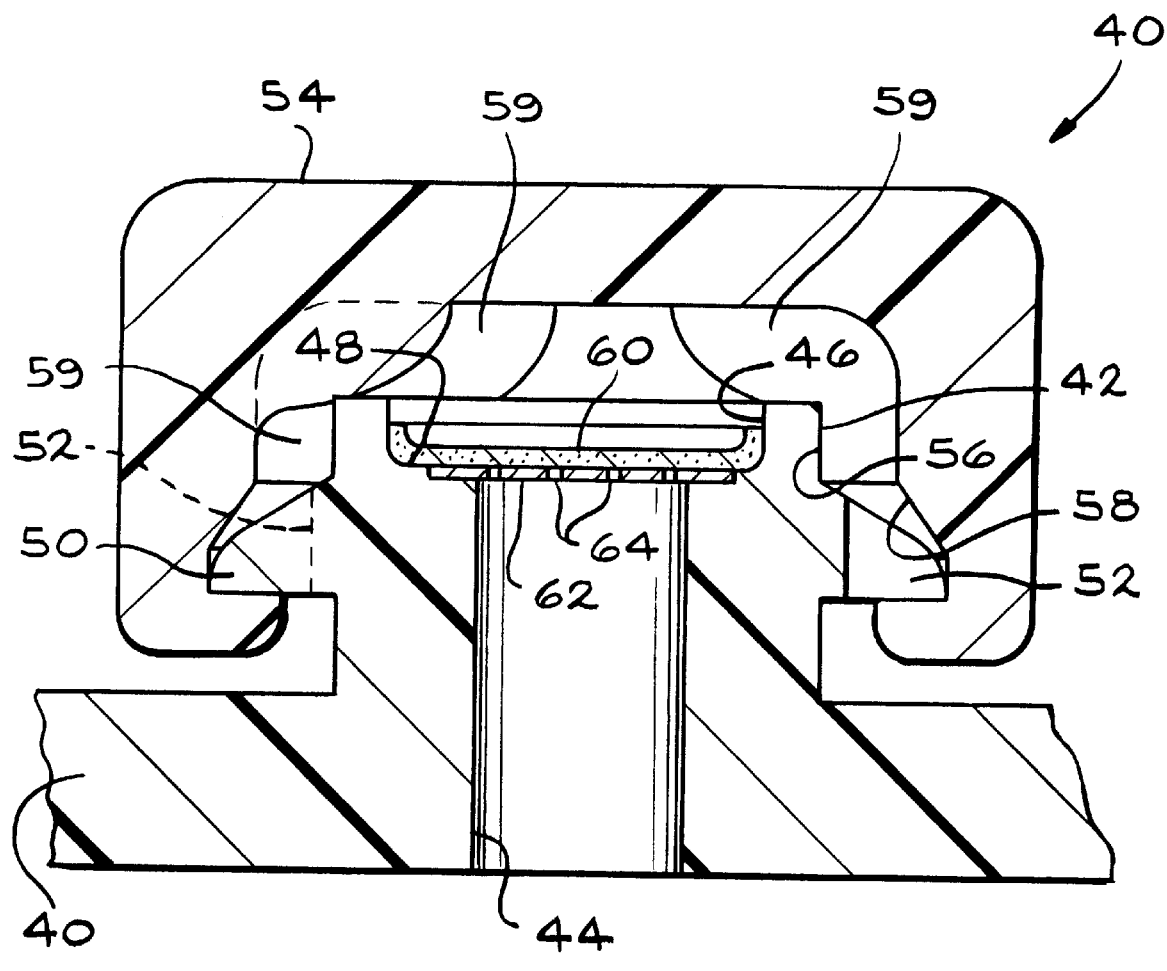
FIG. 2 is a partially enlarged sectional view of a first embodiment of the cap of the reservoir illustrated in FIG. 1.

The reservoir 10 further includes a cap 40 for generally closing off the opening 38 of the spout 36. The cap 40 can be retained on the spout 36 by any suitable manner, such as by a frictional fit or threaded engagement therewith. As best shown in FIG. 2, the cap 40 has a generally cylindrical extension 42 extending upwardly therefrom. A generally cylindrical passageway 44 is formed through the extension 42. A cylindrical recess 46 is formed at the upper end of the extension 42, as shown in FIG. 2, forming a stepped shoulder 48. The extension 42 further includes an annular flange 50 extending radially outwardly therefrom. The annular flange 50 includes a plurality of notches 52 formed therein, the reason for which will be explained below.

The reservoir cap 40 further includes a cover 54 which fits over the extension 42. The cover 54 includes a recess 56 formed therein for receiving the extension 42. The cover 54 is retained on the extension 42 by an annular groove 58 formed therein which receives the annular flange 50 of the extension 42. The cover 54 includes a plurality of radial grooves 59 formed therein. The hollow spout 36, the passageway 44 of the extension 42, the radial grooves 59 of the cover 54, and the notches 52 of the annular flange 50 of the extension 42 define a vent passageway in communication with the interior chamber 32 of the reservoir and the atmosphere. The reservoir 10, as illustrated in FIGS. 1 and 2, is of a vented design, wherein the brake fluid stored in the chamber 32 of the reservoir 10 is vented to atmospheric pressure so that as the fluid level within the reservoir changes, a pressure differential between the air filled space of the chamber 32 of the reservoir 10 and the atmosphere does not occur.

As best shown in FIG. 2, the reservoir 10 includes a membrane 60 which is disposed within the vent passageway. The membrane 60 preferably is made of a filter material having oleophobic properties. The term "oleophobic properties" as used herein refers to the properties of a membrane or filter that permits relatively high levels of gas or air to pass therethrough, but substantially prevents the passage of oil based liquids, such as brake fluid. The membrane 60 also preferably has hydrophobic properties such that the membrane 60 permits high levels of gas or air to pass therethrough, but substantially prevents the passage of water through the membrane 60. The membrane 60 provides ventilation to the chamber 32 of the reservoir 10 because air can pass through the vent passageway through the membrane 60. However, the membrane 60 also acts as a liquid and solid barrier, thereby preventing the brake fluid from flowing through the membrane 60 and spilling out from the chamber 32. A known filter membrane having oleophobic and hydrophobic properties, which can be used for the membrane 60, is an acrylic copolymer cast on a non-woven nylon support, sold under the trademark VERSAPOR and manufactured by Gelman Sciences having an office in Ann Arbor, Mich. The membrane may be constructed of a single or combination of polymers that provide a three-dimensional structure containing pores or passageways through the membrane. A preferred average pore size for the membrane 60 is within the range of about 1.0 $\mu$m to about 10 $\mu$m. The pore size is generally an indication of the size particle that will be retained by the membrane in a liquid system and is measured indirectly, such as by measuring the air pressure required to force a known fluid from the pores of a wetted membrane. Preferably, the membrane 60 permits an air flow rate greater than about 10 lpm/cm$^2$/bar, and more preferably within the range of about 17 to about 43 lpm/cm$^2$/bar. The air flow rate is generally an indication of how easily air passes through the membrane. Preferably, the membrane 60 has a water intrusion or breakthrough pressure greater than 0.5 p.s.i. and more preferably between a range of about 1.8 to about 5.5 p.s.i. so that the membrane 60 substantially prevents the passage of brake fluid therethrough in normal operating conditions of the brake system. Water intrusion pressure is generally a measure of the pressure required to force water into a hydrophobic membrane.

The membrane 60 also helps prevent contaminants, such as water and oil, from entering the chamber 32 of the reservoir 10. The configuration of the cover 54 and the extension 42 also helps retard the entrance of contaminants since the contaminants would have to travel upward through the notches 52 of the annular flange 50 and the radial grooves of the cover 54.

The membrane 60 can be secured to the cap 40 by any suitable manner. In the embodiment of the reservoir 10 illustrated in FIGS. 1 and 2, the membrane 60 has a generally circular disk shape and is disposed in the recess 46 formed at the upper end of the extension 42. The membrane 60 covers the entire area of the passageway 44 of the extension 42 so that the membrane 60 is disposed in the vent passageway. The membrane 60 is retained in the recess 46 by the shoulder 48. Preferably, the diameter of the membrane 60 is slightly larger than the diameter of the recess 46 to help secure the membrane by a frictional fit against the wall of the recess 46. The membrane 60 can also be retained by heat, radio frequency, or ultrasonic sealing methods. The membrane 60 may also be supported vertically across the passageway 44 of the extension by a perforated retainer plate 62. The retainer plate 62 is retained in the recess 46 of the extension 42 by the stepped shoulder 48. The retainer plate 62 is positioned adjacent the membrane 60 and provides vertical support for the membrane 60. The retainer plate 62 includes a plurality of openings 64 to allow the passage of gas or air therethrough.

Although the membrane 60 is described and shown in FIGS. 1 and 2 as being located in the cap 40, it should be understood that the membrane 60 and vent passageway can be located separate from the cap 40, and can be located at any suitable upper portion of the reservoir where an air pocket within the chamber 32 is likely to exist. If desired, the structures and the vent passageway of the cap 40 can be formed integral with the housing 23 of the reservoir 10.

Figure 3:
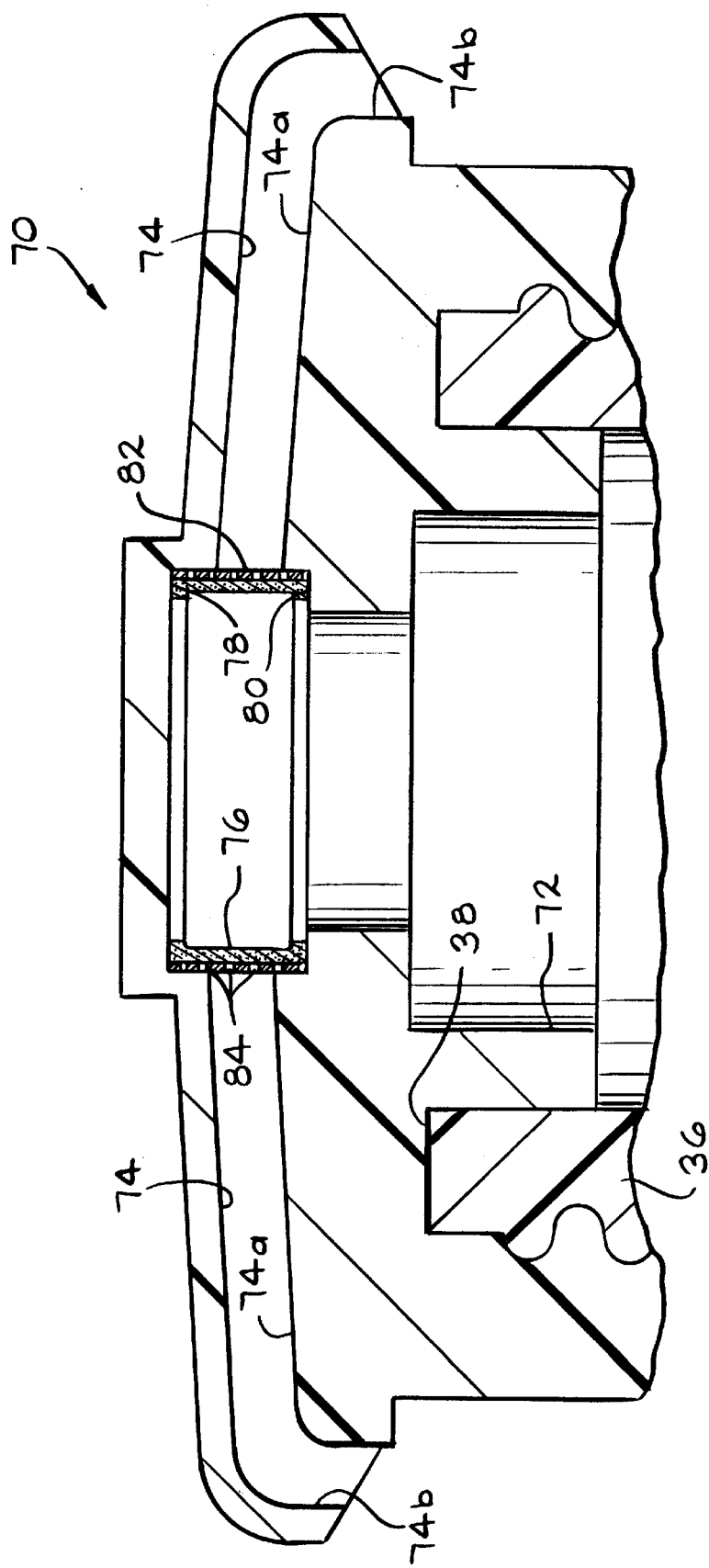
FIG. 3 is a sectional view of a second embodiment of a cap, in accordance with the present invention.

There is illustrated in FIG. 3 a second embodiment of a reservoir cap, indicated generally at 70, which can be used with the reservoir 10 illustrated in FIG. 1. The cap 70 functions similarly to the cap 40, illustrated in FIGS. 1 and 2, by generally closing off the relatively large opening 38 of the hollow spout 36 and providing venting to the chamber 32. The cap 70 can be secured to the spout 36 of the reservoir 10 by any suitable manner, such as by a frictional fit or threaded engagement. The cap 70 has a stepped bore 72 extending generally vertically therein. The bore 72 is in communication with the spout 36, and therefore, the chamber 32 of the reservoir 10. The cap 70 also has a plurality of ducts 74 formed therein. The ducts 74 have main portions 74a which are sloped in a slight downward direction, and end portions 74b having a generally vertical orientation, as shown in FIG. 3. The ducts 74 are in communication with the bore 72 and the atmosphere. The hollow spout 36, the bore 72, and the ducts 74 define a vent passageway in communication with the atmosphere and interior chamber 32 of the reservoir 10.

The cap 70 further includes a tubular shaped membrane 76 preferably having the same oleophobic and hydrophobic properties as the membrane 60, as described above. The membrane 76 is disposed in the stepped bore 72 of the cap 70 and is axially supported between annular shoulders 78 and 80 formed in the cap 70. An optional tubular shaped retainer ring 82 may be used to radially support the membrane 76. The retainer ring 82 is supported between the shoulders 78 and 80 and is positioned radially outwardly from the membrane 76. The retainer ring 82 includes a plurality of openings 84 to allow the passage of gas or air therethrough. Although the retainer 82 is shown positioned radially outwardly from the membrane 76, the retainer ring 82 could be provided with a smaller diameter than the membrane 76 and positioned radially inwardly from the membrane 76.

As shown in FIG. 3, the tubular shaped membrane 76 is oriented such that its axis is generally vertical. This orientation is advantageous because the major surfaces of the membrane are oriented in a generally vertical manner, as shown in FIG. 3. Brake fluid which contacts the vertical walls of the membrane 76 will simply fall downward due to gravity. Therefore, brake fluid or other contaminates are not likely to collect on the membrane 76. Similarly, contaminates, such as water, from outside of the reservoir 10 will not collect on the outer surface of the membrane 76, but will travel downward and out through the sloped main portions 74a of the ducts 74. Also, brake fluid which is forced or jolted up through the bore 72 will likely wash any sediment collected on the membrane 76, thereby self-cleaning the surface of the membrane 76 for more efficient air flow passage.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A reservoir for a master cylinder being used in atmosphere comprising:

a housing having a chamber formed therein for the storage of brake fluid, said housing having an opening in communication with the atmosphere, said housing further including a passageway in communication with said cavity and said opening;

a membrane disposed in said passageway, wherein said membrane permits the passage of air therethrough and substantially prevents the passage of brake fluid therethrough; and a perforated retainer having a plurality of openings formed therein which permit the passage of air therethrough, said retainer positioned adjacent to and contacting said membrane for supporting said membrane in said housing.

2. The reservoir of claim 1 further including a cap for closing a filling port of said reservoir, said membrane disposed in said cap.

3. The reservoir of claim 1, wherein said retainer and said membrane covers the entire cross-sectional area of said passageway.

4. The reservoir of claim 1, wherein said membrane has a vertically oriented surface.

5. The reservoir of claim 1, wherein said membrane is cylindrical disk shaped.

6. The reservoir of claim 5, wherein said cylindrical disk shaped membrane defines an axis, said membrane being disposed in said passageway such that said axis is generally vertical.

7. The reservoir of claim 5 wherein said retainer is cylindrical disk shaped and is disposed in said passageway.

8. The reservoir of claim 1, wherein said membrane is tubular shaped.

9. The reservoir of claim 8, wherein said tubular shaped membrane defines an axis, said membrane being disposed in said passageway such that said axis is generally vertical.

10. The reservoir of claim 8 wherein said retainer is tubular shaped and is disposed in said passageway.

11. The reservoir of claim 1, wherein said membrane has an air flow rate greater than about 10 lpm/cm$^2$/bar.

12. The reservoir of claim 1, wherein said membrane has a water intrusion pressure greater than 0.5 p.s.i.

13. A cap for a master cylinder reservoir having a fluid chamber formed therein, said cap comprising:

a housing having a passageway formed therethrough, said passageway being in communication with the fluid chamber of the reservoir and atmosphere;

a membrane disposed in said passageway, wherein said membrane permits the passage of air therethrough and substantially prevents the passage of brake fluid therethrough; and a perforated retainer having a plurality of openings formed therein which permit the passage of air therethrough, said retainer positioned adjacent to and contacting said membrane for supporting said membrane in said housing.

14. The reservoir of claim 13, wherein said membrane has a vertically oriented surface.

15. The reservoir of claim 13, wherein said membrane is cylindrical disk shaped defining an axis, said membrane being disposed in said passageway such that said axis is generally vertical.

16. The reservoir of claim 13, wherein said membrane is tubular shaped defining an axis, said membrane being disposed in said passageway such that said axis is generally vertical.

17. A vehicle brake system comprising:
- a master cylinder including a housing having a bore formed therein;
- a reservoir connected to said master cylinder, said reservoir including a housing having a chamber formed therein for the storage of brake fluid, said chamber in fluid communication with said bore of said master cylinder, said housing of said reservoir having an opening in communication with the atmosphere, said housing of said reservoir further including a passageway in communication with said chamber and said opening;
- a membrane disposed in said passageway, wherein said membrane permits the passage of air therethrough and substantially prevents the passage of brake fluid therethrough; and
- a perforated retainer having a plurality of openings formed therein which permit the passage of air therethrough, said retainer positioned adjacent to and contacting said membrane for supporting said membrane in said housing.

18. The brake system of claim 17, wherein said reservoir includes a cap for closing a filling port of said reservoir in fluid communication with said chamber, said membrane disposed in said cap.

19. The brake system of claim 17, wherein said membrane is cylindrical disk shaped defining an axis, said membrane being disposed in said passageway such that said axis is generally vertical.

20. The brake system of claim 17, wherein said membrane is tubular shaped defining an axis, said membrane being disposed in said passageway such that said axis is generally vertical.

\* \* \* \* \*